Jan. 14, 1930.  C. H. QUINN  1,743,621
CONTROL MECHANISM
Filed Dec. 26, 1923
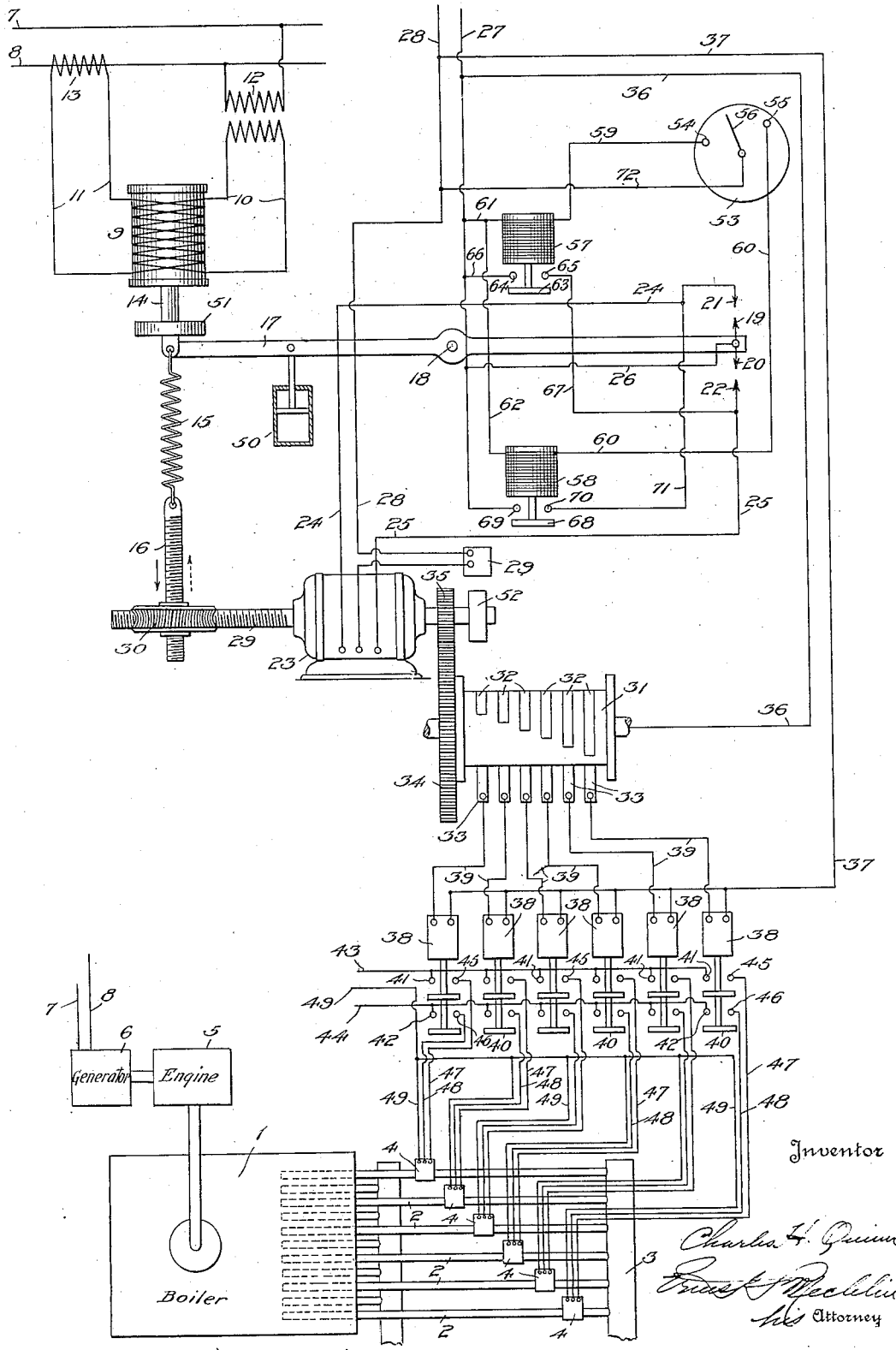

Patented Jan. 14, 1930

1,743,621

UNITED STATES PATENT OFFICE

CHARLES HENRY QUINN, OF SAN FRANCISCO, CALIFORNIA

CONTROL MECHANISM

Application filed December 26, 1923. Serial No. 682,664.

The invention relates generally to control mechanism for automatically regulating the fuel supply used in connection with power plants developing relatively large sources of power such as electricity upon which varying demands for use are constantly being made.

One of the principal objects of the invention, particularly stated, is to provide a control system which will automatically increase or decrease the firing capacity of the steam generating boilers of the power plant, the rate of increase or decrease in firing the fuel being effected through the operation of mechanism responsive to the several loads or power demands upon the current generated by the plant.

Particularly stated, the invention has for one of its objects the provision of a plurality of control devices for regulating the rate of fuel consumption, one of said devices being interconnected with the bus-bars of an electric system for detecting the variation in consumption of current; and the other of said devices being associated with a steam gage of the boiler or boilers of the plant and operable independently of the device associated with the bus-bars when the steam pressure exceeds or falls below the requirement of the plant, said arrangement of controlling devices providing for an exceedingly economical operation of the plant without reducing or otherwise affecting its operation under very heavy current consumption conditions.

Another object of the invention is to provide a particularly responsive system of controls for economically regulating the rate of consumption of fuel in a power plant generating electricity, said system including among other things a magnetic coil having windings arranged to give respectively a magnetic flux in proportion to the voltage across the bus-bars and the magnetic flux in proportion to the current flowing in one of the bus-bars; a movable switch member adapted to close a circuit for operating a motor in either direction, said motor being designed to either open or close successively a plurality of circuits each of which is interconnected with the control apparatus of a suitable fuel handling mechanism such as stokers, burners for powdered fuel, and burners for oil.

A further object of the invention resides in the production of a comparatively simple and exceedingly responsive control mechanism for economically operating power plants generating electricity, said mechanism serving to reduce to a minimum the time lag between changes in bus-bar power requirements and the increase or decrease in the necessary boiler fuel, the operation of said mechanism practically instantaneously changing the rate of firing the fuel to correspond with the variable steam requirements.

With these and other objects in view, the invention further consists in the combination and arrangement of the several parts hereinafter described and pointed out in the claims.

Referring to the drawing which diagrammatically illustrates the invention as applied to a power plant, there is shown a steam generating boiler, or series of boilers 1 having a plurality of units 2, such as stokers or burners for oil or powdered fuel, said units extending into the boiler and having connection with a common source of fuel supply indicated by the numeral 3. Each of the units is caused to be brought into operation for increasing or decreasing the firing capacity of the boiler by means of a control device 4, said apparatus being actuated by the electric current passing through the wires shown connected to the respective control devices 4. As will be understood, the steam leaving the boiler is conducted to a suitable engine 5 which operates the generator 6 for delivering current utilized in the system to the bus-bars 7 and 8.

The means for detecting variations in consumption of current in the system comprises a magnetic coil 9 connected to the bus-bars 7 and 8, said coil having one winding 10 arranged to produce a magnetic flux in proportion to the voltage across the bus-bars and along the winding 11 adapted to give a magnetic flux in proportion to the current flowing in the bus bar 8. The transformer 12 is arranged in the circuit of the winding 10 so that the current in said winding will be in proportion to the voltage. A transformer 13 is provided in the circuit of the winding 11 and provides for the current being in proportion to the current in the bus-bar 8. The combined flux in the magnet will be equivalent to the effect of the two windings and will, within certain limits, represent the power available on the bus-bars 7 and 8. The diagrammatic showing illustrates an arrangement such as might be used with an alternating current installation. In some cases, and if desired, the magnet can be arranged to operate with either of the windings singly.

A magnet member or bar 14 is adapted to be operated by the magnetic pull developed in the coil 9 as the result of varying load conditions occurring in the bus-bars, said pull being resisted by the spring 15, one end of which is connected to the magnetic member and the other end of which is attached to a relatively movable member 16 for increasing or decreasing the tension thereof. The magnet member 14 is connected to one end of a switch member, said member comprising a lever or arm 17 pivotally mounted at 18 and having its opposite end provided with a plurality of contacts adapted to close electric circuits for actuating the operating mechanism, which mechanism in turn effects the successive closing of a plurality of circuits for operating the several fuel firing devices.

Contacts 19 and 20 are provided on the switch arm 17, said contacts cooperating with contacts 21 and 22 arranged in separate electric circuits adapted to be closed to effect operation of the reversible electric motor 23 in opposite directions of rotation according to the increased or decreased power consumption occurring in the system. Leading from the contact 21 is the wire or conductor 24, said conductor being connected to a suitable terminal provided on the motor 23. The contact 22 is also connected with the motor by means of the conductor 25 leading from said contact and ending in a suitable terminal connection on the motor, as shown. The contacts 19 and 20 of the switch arm are each connected to the conductor 26 which in turn is connected to one of the current conducting wires 27 leading from any suitable source of electric supply. The other wire conducting the current from the source of supply is designated by the numeral 28, said wire being preferably connected in circuit with a magnetic brake coil 29 and leading into the motor 23. Upon closing of either of said contacts 19 and 20 or 21 and 22, the motor 23 will be caused to operate in a manner to be presently described.

The magnetic coil 9 constituting the variable load detecting mechanism is connected to the bus-bars and is normally energized to maintain the switch arm 17 in neutral position with both sets of contacts open, thereby preventing the passage of the electric current through the conductors 27 and 28 for operating the motor 23. The spring 15 is tensioned to resist the normal pull of the magnet member 14 by the coil 9 and as the tension of said spring is controlled by the operation of the motor 23, the associated parts will remain in balanced relation as long as the controlling mechanism is inoperative and no appreciable increased demands or reductions in current consumption occur in the system.

When an increased demand is made on the line the detecting mechanism responds through the respective windings of the coil and increases the flux occurring therein, thereby causing the magnet member 14 to overcome the resistance offered by the spring 15 and in so doing move the switch member 17 which latter in turn closes one of the motor circuits through contacts 20 and 22. The operation of the motor causes the actuation of an automatic means for increasing the tension of the spring resistance which ultimately overcomes the increased pull of the magnetic flux, thereby separating contacts 20 and 22 and opening the circuit to stop the motor. The tension of the spring 15 is increased through the operation of a worm 29 connected to the motor shaft, said worm meshing with the worm gear 30 through which latter passes the screw or worm end of the movable spring tension member 16. During the operation of the motor the tension member 16 is fed in the direction of the arrow shown in full lines, said tension gradually increasing and ultimately overcoming the magnetic energy of the coil 9 and effecting the withdrawal of the magnet member 14 and the return of the switch arm 17 to normal position.

When the motor is actuated as the result of the operation of the detecting mechanism in responding to increased demands on the line, the means for increasing the rate of firing of the fuel used in the boiler is brought into operation. This means includes a movable contact member 31 shown in the form of a revoluble drum having thereon a plurality of contacts 32 arranged to successively co-act with a corresponding number of relatively fixed contacts 33. The drum is provided with a gear 34 having meshing therewith a pinion 35 carried by the motor shaft, said drum being caused to rotate in one direction when the motor is energized by the closing of one of the circuits through the contacts 20 and 22. The successive closing of the several contacts serves to progressively increase the rate of consumption of fuel for effecting the operation of the actuating devices indicated by the numeral 4 and controlling the fuel units 2.

Electric current for operating the mechanism controlling the actuation of the devices 4 may be brought through conductors 36 and 37, the former leading from the supply wire 27 and terminating in the drum 31 for common connection to the several contacts 32, and the latter leading from the supply wire 28 and being connected to a terminal of each of a series of magnetically operating valves or devices 38. The contacts 33 are each connected by means of the conductors 39 to the other terminal of the respective magnetic controlling devices 38 whereby upon the revolving of the drum 31 the several circuits are successively closed and the magnetic controlling devices progressively operated.

The operation of the magnetic devices 38 is effected through two-pole switches 40, said switches cooperating respectively with the contacts 41 and 42 connected to the current supplying conductors 43 and 44 and the contacts 45 and 46 from which lead the conductors 47 and 48 to the fuel controlling devices 4. A three-wire system may be used incorporating the conductor 49, leading respectively to the controlling devices 4. The fuel controlling devices 4 may be in the form of magnet valves, motors or other apparatus designed to bring into and out of operation the burner or stoker units 2 supplying the additional fuel to increase the firing capacity of the boiler.

The several fuel controlling devices are each brought into successive operation according to the continued operation of the motor, thereby increasing the rate of consumption of fuel with a corresponding increase in the evaporation of the water in the boiler for producing the necessary steam to maintain the current in the system up to the demands made thereon. The timing of the movement of the rotary drum and the movement of the means increasing the tension on the spring 15 is such as to properly provide for the overcoming of the pull of the magnetic coil 9 after the necessary amount of increased firing of the boiler has been accomplished, thereby causing the switch arm 17 to be returned to normal position and the motor stopped.

Any reduction in the current or voltage in the magnetic coil line will cause the energized spring 15 to overcome the balance of the switch arm 17 by exerting an outward pull on the magnet member 14, which movement will close the circuit through contacts 19 and 21 and conductor 24 for reversing the motor. The rotation of the motor in the opposite direction acts to open the circuits controlling the increased fuel supply by separating the contacts 32 and 33 in the reverse order of their successive closing when actuating the mechanism to increase the firing capacity of the boiler. During this reverse operation of the motor, the magnetic controlling devices 38 operate to open the two-pole switches, thus breaking the circuits controlling the mechanism regulating the fuel feeding or burning devices. As a result of this operation, a reduction in the firing capacity of the boiler is obtained with correspondingly less consumption of fuel.

Upon the reversing of the motor it will be observed that the worm 29 connected to the motor shaft causes the worm gear 30 to rotate in the reverse direction thereby causing the feed screw of the tensioning member 16 to move in the direction of the arrow shown in dotted lines for restoring the spring to its initial tension in normally balancing the switch arm with relation to the flux occurring in the magnetic coil. As soon as the tension in the spring is reduced sufficiently to permit the flux of the magnetic coil 9 to exert an inward movement to the magnet member 14, the spring arm 17 is caused to move and the circuit heretofore closed to reverse the motor is opened and the mechanism is stopped with the result that the additional or increased firing capacity of the boiler is no longer operating to generate steam in excess of the quantity required for service demands now existing in the system.

The switch arm may be provided with a dash pot 50 for steadying the movement of said arm. For obtaining relatively fine adjustment of the magnet member 14 with relation to the coil operating the same, adjustable counter weights indicated by the numeral 51, may be provided. A brake wheel 52 is preferably provided to prevent overrun of the motor when the power is off.

The means providing the independent control of the associated mechanisms and thereby preventing relatively wide variation in the operation of the equipment, involves a steam gage 53 having adjustable contacts 54 and 55 between which is operable a member 56 preferably movable with the pointer of the gage and adapted to engage either of said contacts for closing an electric circuit and operating the reversible motor 23. Two electromagnets 57 and 58 are arranged in the circuits controlling the operation of the motor through the steam pressure registered on the gage, the magnet 57 being connected through the conductor 59 to the contact 54 or low pressure side of the gage, and the magnet 58 being connected by means of conductor 60 to the high pressure side of said gage. A conductor 61 connects the magnet 57 to the supply wire 27 and the conductor 62 leads from the magnet 58 to the conductor 61 for receiving the current from the same supply wire 27.

Extending from the magnet 57 is a movable switch member 63, said member upon the energizing of the magnet, by reason of the member 56, striking the contact 54, being caused to move to close a motor circuit through contacts 64 and 65. This operation acts to effect the rotation of the drum 31 for actuating the fuel controlling devices and increasing the firing capacity of the boiler. The contact 64 is connected by the conductor 66 to the current supply wire 27 and the contact 65 is connected to the conductor 67 which in turn is connected to the wire 25 of the switch arm and motor circuit hereinbefore described. The magnet 58 is provided with a movable switch member 68 adapted to close a circuit through contacts 69 and 70 when said magnet is energized by the movable member 56 of the steam gage striking the contact 55. The contact 69 is connected to the supply wire 27 and the contact 70 is connected by the conductor 71 to the wire 24 of the circuit hereinbefore described as effecting the reversal of the motor when reducing the firing capacity of the boiler.

When the steam pressure exceeds the requirements of the plant, the magnet 58 acts to close the motor circuit through the contacts 69 and 70 and conductor leading therefrom to the motor, thereby causing the latter to rotate in the reverse direction and successively open the several circuits controlled by the contacts on the drum 31, thus reducing the rate of consumption of fuel with a corresponding drop in the steam pressure. The movable contact member 56 is connected by the conductor 72 to the supply wire 28 and as the contacts 54 and 55 can be adjusted it will be understood that an exceedingly responsive and independent control can be obtained in addition to the magnetic flux detecting means energizing the coil connected to the bus-bars.

The limitation of the movement of the drum contact member 31 when operated by the steam gage contacts is controlled by any suitable means acting to stop the drum at fixed points corresponding to its movement in cutting out of operation all of the magnetic controlling devices 38, or by the falling of the steam pressure sufficient to break the circuit between the contacts 55 and 56.

A controlling mechanism constructed in accordance with the present invention provides a very accurate apparatus for obtaining an exceedingly economical operation of the power plant, it being observed that the increased steam demand by the evaporation of additional water in the boiler can be almost instantaneously brought about. This will be readily apparent when it is understood that the water held under temperature and pressure in the boiler contains a well defined amount of stored energy which energy is available in the form of steam as soon as the pressure on the water begins to drop. This fact assures the proper operation of the plant for a short period in taking care of the increased demand for steam utilized in the engine or prime mover operating the electrical generator, but beyond this comparatively short period the increased demand for steam can only be served by evaporating more water with an increased rate of firing of the fuel. In electric power plants and current transmitting systems there is a measurable time or period between the movement of change in electrical bus-bar loads to the reaction of the boiler water under temperature and pressure. This time lag on power stations with widely varying loads of relatively short duration is reflected in sudden demands for increase or decrease in the amount of fuel being burned at any particular moment. By the present invention additional fuel can be delivered or the fuel cut off from the boilers at the moment of increase or decrease respectively in bus-bar power demand, thereby reducing the resultant variation in change of boiler steam pressure to a minimum.

Changes necessary to adapt the invention to different power plants may be made and if installation is used for increasing or decreasing the rate of firing fuel on an entire plant at one time a group of magnetically operated devices similar to those indicated at 38 will control the speed of the stoker operating motor, or suitable mechanical or electrical attachments can be made to vary the tension or governor spring controlling the speed of the engine or turbine driven equipment operating the forced draft fans and stokers.

I claim:

1. The combination with an electric power plant and current transmitting system, of steam producing means involving a plurality of fuel firing devices operable to increase or decrease the steam supply, a magnetic coil connected to the current transmitting system and responsive to the fluctuations in electrical loads thereon, a magnet member operable by said coil, a switch connected to said magnet member, means for maintaining said switch in neutral position corresponding to normal working loads of the system, and means including a plurality of electrical circuits controlled by said switch member for actuating the fuel firing devices.

2. The combination with an electrical power plant and current transmitting system, of steam producing means involving a plurality of fuel firing devices operable to increase or decrease the steam supply, a magnetic coil connected to the current transmitting system and responsive to the fluctuations in electrical loads thereon, a magnet member operable by said coil, a switch connected to said magnet member, adapted to close an electric circuit, means connected to the magnet member for resisting the normal magnetic pull of the coil, and means including a motor and movable contact member for successively actuating the fuel firing devices, said last named means acting to increase the strength of the means resisting the aforesaid magnetic pull whereby the same is overcome for returning the switch member to normal position for breaking the electric circuit operating said motor and contact member.

3. The combination with an electric power plant and current transmitting system, of steam producing means involving a plurality of fuel firing devices adapted to increase or decrease the steam supply, electric means connected to the transmitting system and responsive to the fluctuations in loads imposed thereon, means operable by said electric means for closing an electric circuit, means for normally maintaining said last named means in position with the circuit open, and electrically operated means for successively actuating the fuel firing devices, said last named means automatically controlling the means closing the electric circuit whereby upon actuation of the fuel firing devices to increase the steam supply to the desired requirement, said means will operate the means closing the circuit whereby the latter is opened for stopping the actuation of the electrically operated means controlling the fuel firing devices.

4. The combination with an electric power plant and current transmitting system, of steam producing means involving a plurality of fuel firing devices adapted to increase or decrease the steam supply, electric means connected to the transmitting system and responsive to the fluctuations in loads imposed thereon, means operable by said electric means for closing an electric circuit, means for normally maintaining said last named means in normal position with the circuit open, electrically operated means for successively actuating the fuel firing devices, and means operable by said last named means for controlling the means closing the electric circuit whereby the fuel firing devices are automatically operated to increase or decrease the steam supply proportional to the loads imposed upon the system.

5. The combination with an electric power plant and current transmitting system, of steam producing means involving a plurality of fuel firing devices adapted to increase or decrease the steam supply, electric means connected to the transmitting system and responsive to the fluctuations in loads imposed thereon, means operable by said electric means for closing an electric circuit, means for normally maintaining said last named means in position with the circuit open, electrically operated means for successively actuating the fuel firing devices, and means including a yieldable member connected to the electric means receiving the load fluctuations, said last named means being automatically operated to control the means opening and closing the electric circuit.

6. The combination with an electric power plant and current transmitting system, of steam producing means involving a plurality of fuel firing devices adapted to increase or decrease the steam supply, electric means connected to the transmitting system and responsive to the fluctuations in loads imposed thereon, means operable by said electric means for closing an electric circuit, means for normally maintaining said last named means in neutral position with the circuit open, electrically operated means for successively actuating the fuel firing devices, means controlled by said last named means for operating the means closing and opening the electric circuit whereby the fuel firing devices are caused to increase or decrease the steam supply in proportion to the electric loads on the system, and means including an electric circuit for independently operating the electrical means controlling the fuel firing devices, said last named means involving a steam pressure gage having relatively movable and fixed contacts connected to said circuit whereby the means electrically operating the fuel firing devices will be actuated for maintaining the steam supply at pressures commensurate with the varying electrical loads on the system.

7. The combination with an electric power plant and current transmitting system, of steam producing means involving progressively actuated fuel firing devices for increasing or decreasing the steam supply, means electrically actuated by the transmitting portion of the system for detecting the fluctuations in loads thereon, an electric circuit and switch controlling means therefor, means for normally balancing said switch with the circuit open, said electrically actuated means serving to close the circuit upon a variation of the power delivered by the transmitting system, and means including a reversible motor and rotary contact member for successively increasing the firing rate of the fuel firing devices when the circuit is closed for operating the motor in one direction, said electrically actuated means serving, when the power delivered varies in the other direction, for closing another circuit to actuate the motor and rotary contact member in an opposite direction.

In testimony whereof I affix my signature.

CHARLES HENRY QUINN.